(12) United States Patent
Westphal et al.

(10) Patent No.: US 7,431,034 B2
(45) Date of Patent: Oct. 7, 2008

(54) OXYGEN EMERGENCY SUPPLY MEANS

(75) Inventors: Andreas Westphal, Eutin (DE); Jens Lembke, Lübeck (DE); Gerd Wotha, Warnsdorf (DE)

(73) Assignee: DAe Systems GmbH, Lübeck (DE)

( * ) Notice: Subject to any disclaimer, the term of this patent is extended or adjusted under 35 U.S.C. 154(b) by 499 days.

(21) Appl. No.: 11/141,119

(22) Filed: May 31, 2005

(65) Prior Publication Data
US 2005/0263156 A1    Dec. 1, 2005

(30) Foreign Application Priority Data
Jun. 1, 2004    (DE) .................... 10 2004 026 649

(51) Int. Cl.
*A62B 7/00*    (2006.01)
(52) U.S. Cl. ............................ 128/204.18; 244/118.5
(58) Field of Classification Search ............ 128/204.18; 244/118.5, 147, 119; 144/129.1
See application file for complete search history.

(56) References Cited

U.S. PATENT DOCUMENTS

| | | | | |
|---|---|---|---|---|
| 2,931,355 A | * | 4/1960 | Miller et al. ............ | 128/204.29 |
| 3,503,394 A | * | 3/1970 | Hotz et al. ............. | 128/206.27 |
| 4,154,237 A | | 5/1979 | Courter | |
| 4,481,945 A | * | 11/1984 | Levine .................. | 128/206.27 |
| 4,883,242 A | * | 11/1989 | Becker et al. ............ | 244/118.5 |
| 4,909,247 A | * | 3/1990 | Terrisse et al. ......... | 128/206.27 |
| 6,089,230 A | * | 7/2000 | Barker et al. ........... | 128/204.29 |
| 6,336,667 B1 | * | 1/2002 | Ford et al. .................... | 292/25 |
| 6,497,386 B2 | * | 12/2002 | Martinez ................. | 244/118.5 |

\* cited by examiner

*Primary Examiner*—Steven O Douglas
(74) *Attorney, Agent, or Firm*—McGlew & Tuttle, P.C.

(57) ABSTRACT

The oxygen emergency supply device for an aircraft is equipped with a receptacle in which at least one oxygen mask is arranged. The receptacle comprises a lid which opens in the case of release and releases the oxygen mask. Handling device for reaching and applying the oxygen mask and a device for releasing the oxygen supply to the mask are provided. The handling device has at least one arm which in the case of release extends out of the receptacle through the lid opening into a position laterally of the mask drop axis so that the mask may be reached by a person seated laterally of the mask drop axis.

20 Claims, 3 Drawing Sheets

OXYGEN EMERGENCY SUPPLY MEANS

CROSS REFERENCE TO RELATED APPLICATIONS

This application claims the benefit of priority under 35 U.S.C. § 119 of German Application 10 2004 026 649.2 filed Jun. 1, 2004, the entire contents of which are incorporated herein by reference.

FIELD OF THE INVENTION

The invention relates to an oxygen emergency supply means for an aircraft with a receptacle in which at least one oxygen mask is arranged.

BACKGROUND OF THE INVENTION

In order to be able to supply passengers and service personnel with oxygen given a sudden drop of pressure in the cabin, oxygen emergency supply means are available in aircraft. These are located in the passenger region in so-called personal service unit channels or regions which are arranged on the cabin ceiling above the passenger seats. For this, in the personal service unit channels, apart from the air supply of the air conditioning installation, electrical displays, lighting etc., receptacles for accommodating the breathing masks for the supply of oxygen and their activation mechanism are provided. These receptacles arranged in the personal service unit channels comprise a flap on the lower side which opens in the case of a decompression of the passenger cabin, so that the breathing masks, suspended on so-called lanyards drop due to gravity. The supply of oxygen is then activated via the lanyard. This is to be understood as a pull-means which is attached between the mask and the activation mechanism of the oxygen supply. The mask is connected to an oxygen supply with a flexible supply tubing.

The activation mechanism is dependent of the type of oxygen supply. Generally a central or decentralised supply system is applied for the supply of oxygen, depending on the aircraft type or aircraft manufacturer.

The central supply system envisages a central oxygen storage or a means functioning with a molecular sieve, from which oxygen is supplied to all oxygen emergency supply means via a pipe network. The oxygen supply conduits open into the storage containers for the oxygen masks. Here the supply of oxygen may be activated via activation valves, so-called manifolds.

With the decentralised supply system, each storage container has its individual gas generator in which oxygen is produced by way of chemical means. The chemicals required are provided is stainless steel cartridges. An exothermic reaction in the cartridge is activated via an ignition procedure, with which pure oxygen is released.

By way of pulling the lanyard, with the central oxygen supply system the manifod is opened and the supply of oxygen is activated. With the decentralized supply an ignition device of the oxygen generator is actuated via the lanyard. The length of the lanyard defines the height at which the breathing mask hangs down from the supply unit.

By way of applying the oxygen mask, a pulling force is also exerted on the lanyard and thus the activation mechanism for the supply of oxygen is activated. As soon as the lanyard has activated the activation mechanism, a further pulling has the effect that the lanyard separates from the activation mechanism so that the entire length of the flexible supply tubing of the mask is released and the breathing mask may be applied onto the face by a person of a defined size. Further pull-means with grip parts, so-called pull-flags are provided on the breathing masks for sleep boxes of large aircraft. Here it is the case of long cords which are fastened on the mask and ensure that the mask hanging on the lanyard may also be reached when the seat located below it is located in a lying position. At its lower end, the pull-flag is made heavier by weight so that it also reliably falls down.

Large aircraft may have a seating arrangement which envisages seating rows of four or more seat locations lying next to one another. In these seat rows, the oxygen masks must also be readily reachable by the passengers on the outer seat locations which may be arranged next to and not below the personal service unit channel.

One solution for such masks which are to be arranged next to the personal service unit is represented in the U.S. Pat. No. 4,154,237. Here, after opening the mask container, apart from the freely-hanging breathing masks, breathing masks are also released which suspended on a rail, are extended horizontally to the outer seat positions. In this manner the breathing masks hang on the flexible supply tubing over the lateral seats from which the breathing masks would otherwise be poorly reached.

The disadvantage with this arrangement is the fact that the lanyards required for activating the supply of oxygen, as in the past, fall downwards out of the mask containers and are poorly accessible at the outer seat positions. Furthermore, on account of the momentary loading on applying the oxygen masks, the rail must be designed in a very stable manner which necessitates an increased weight. In aircraft with which the baggage compartments or hat compartments, so-called hat racks which are arranged laterally next to the personal service unit channel are provided in a lowerable manner, a lowered hat rack would completely prevent the application of this arrangement since it would block the extending of the rails and the rail would be retained with the oxygen masks in the personal service unit.

BRIEF SUMMARY OF THE INVENTION

It is the object of this invention to create an oxygen emergency supply means with which the accessibility of the oxygen masks may be realized in a simple manner, also by those seats which are located laterally next to the mask drop points, in particularly also when the hat racks are provided in a lowerable manner.

The oxygen emergency supply means according to the invention for an aircraft contains a receptacle in which at least one oxygen mask is arranged. The receptacle comprises a lid which opens in the case of activation and releases the oxygen mask with handling means for reaching and applying the oxygen mask, as well as with means for activating the supply of oxygen to the mask. At the same time the handling means comprise at least one arm which in the case of activation extends out of the receptacle through the lid opening into a position laterally of the mask drop axis.

With the oxygen emergency supply means according to the invention, as is usual, the receptacle in which the breathing masks are stored is arranged in the personal service unit channel. In the case of activation the lid of the receptacle opens and all oxygen masks fall out hanging on the lanyards. The dropping of the oxygen masks is stopped by the length of the lanyards whose first end is fastened to the oxygen mask and whose second end to the activation mechanism of the oxygen supply. For supplying a seat arranged next to the mask drop points, an arm extends through the lid opening laterally to the drop axis of the oxygen masks. In its end position the arm is located above or close to the outer seat positions.

Advantageously a guide means is arranged at the free end of the arm, said guide means extending in the drop direction of the oxygen mask. In this manner the guide means is located within the range of a passenger who, from his seated position, may not directly reach the oxygen masks.

The guide means at its end distant to the arm usefully comprises a grip part. This hangs within the range of the passenger and may then be quickly gripped with the hand.

Apart from the guide means, preferably a pull means in the form of a cord or a wire for connecting to the oxygen mask is arranged on the grip part. By way of pulling the grip part, the connection between the arm and the guide means is released. Simultaneously the oxygen mask is applied to the seat position via the pull means. With this, the lanyard fastened on the oxygen mask activates the supply of oxygen and the oxygen mask is ready for application.

Advantageously the arm is formed as a pivot lever. With the emergency opening of the container lid of the oxygen supply thus the arm folds downwards out of the lid opening and pivots in an arc into a horizontal or approximately horizontal position over the seat arranged laterally of the lid opening. At the same time the pivoting force may be introduced for example by way of the gravitational force, a spring force or by way of a pneumatic drive or combinations thereof.

In a preferred embodiment the arm is spring biased in the extending or pivot-out direction. Hat racks, that is to say a storage space, is arranged above the middle seat rows on both sides of the personal service unit. These hat racks on aircrafts with a particularly high cabin height are very difficult to reach. For this reason these hat tracks may be provided in a lowerable manner. If a hat rack in the case of activation of the oxygen emergency supply is located in the lowered condition, then the design of the arm according to the invention prevents it from becoming a hindrance or from it becoming damaged. A blocking of the arm due to a lowered hat rack is not possible. On account of the spring bias of the arm this yields as the case may be.

The arm may advantageously be designed as one piece. In normal flight situation the arm is arranged in the mask container and in an emergency situation after opening the container flap automatically extends downwards and to the side out of the container. Such a one-piece arm may for example be formed of bending-elastic plastic or of a memory metal so that it automatically expands.

The arm is preferably designed of more than one part. At the same time the arm consists for example of two or more elements which are connected to one another via joints. The joints permit the arm to be collapsed and to be arranged collapsed in the container of the oxygen supply in a particularly space saving manner. In the case of application, the collapsed arm folds out of the lid opening, opens out and assumes its predetermined position.

Also at least one part of the arm may be telescopic. Thus the arm for example may be designed as telescopic rail or a telescopic cylinder. In its condition in which it is not telescopically extended, the arm may be stored in the mask container in a space saving manner and in the case of application extends from the container opening in order to expand outside the mask container, for example by way of gravity, spring force or pneumatically.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention is hereinafter explained by way of one embodiment example shown in the drawing wherein.

DETAILED DESCRIPTION OF THE INVENTION

Figure 1:
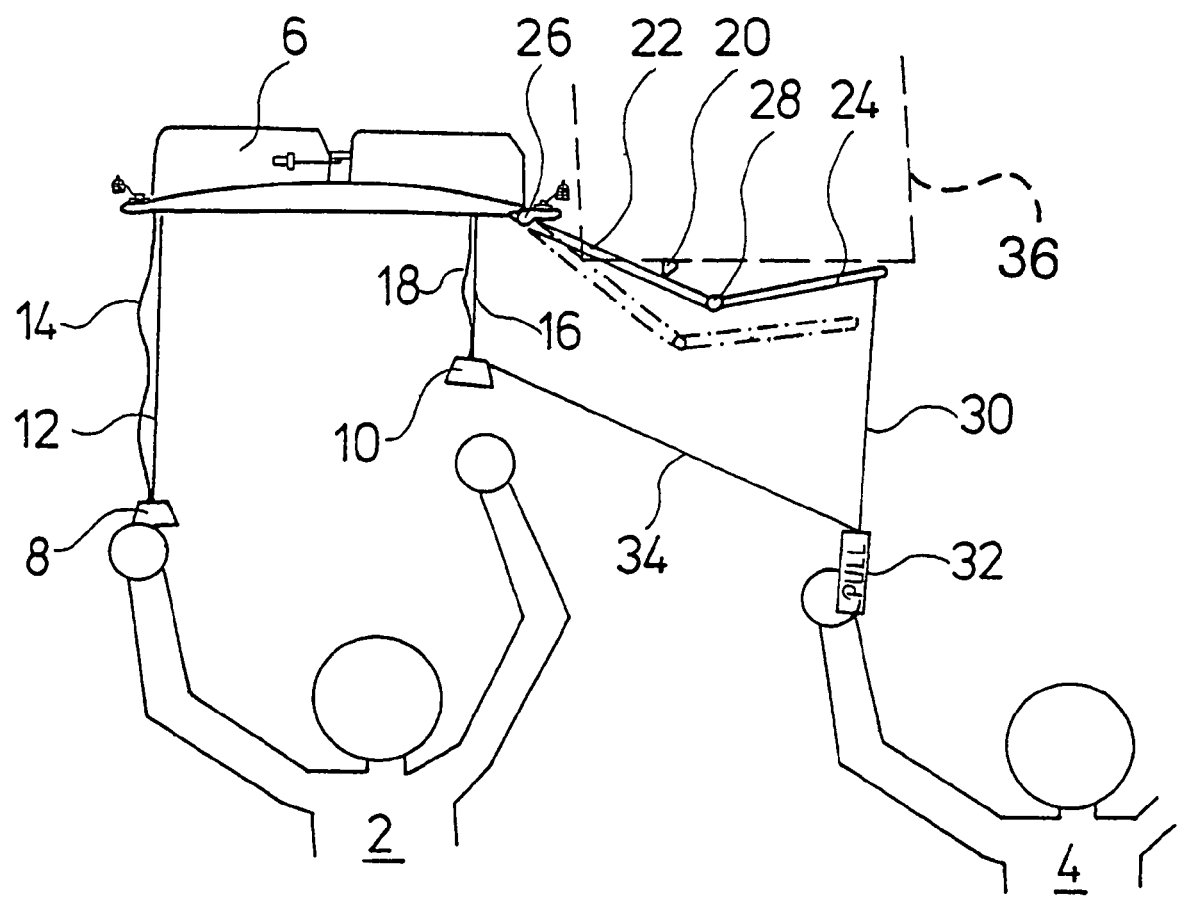
FIG. 1 is a schematic view showing the oxygen emergency supply means according to a first embodiment of the invention.

Referring to the drawings in particular, in FIG. 1, two persons 2 and 4 are represented, of which one person 2 is located directly below a receptacle 6 in which the connections for the supply of oxygen of the oxygen emergency supply means are arranged in a manner known per se and which is not described in detail here. A first oxygen mask 8 and a second oxygen mask 10 are represented released on the occasion of an emergency on the receptacle 6. With this, the first oxygen mask 8 hangs on a lanyard 12 (release cord) and is connected to the oxygen supply via a flexible supply tubing 14. The second oxygen mask 10 is attached to a lanyard 16 and is supplied with oxygen via the flexible supply tubing 18. The lanyards 12 and 16 are release cords/lines or means for activating the oxygen supply to the mask. The number of oxygen masks 8, 10 shown here is purely by way of example. In the normal case the number of masks which are arranged in the receptacle 6 is determined by the number of seats of the corresponding seating row, wherein additional masks (in addition to the number of seats) are provided on account of safety regulations.

One may deduce from FIG. 1 that the length of the lanyards 12 and 16 is different. Thus the lanyard 16 is designed so short that the second oxygen mask 10 is located out of reach of the person 2 located below this oxygen mask 10. In contrast the length of the lanyard 12 permits a drop height of the first oxygen mask 8 which brings this within the reach of the first person 2.

Furthermore a joint arm 20 is connected to the receptacle 6 via a joint 26. The arm 20 is formed of two parts and consists of a first arm part 22 and a second arm part 24. A joint 28 connects the first arm part 22 to the second arm part 24. During normal flight operation the arm 20 as well as all other components of the oxygen emergency supply are arranged in the closed receptacle 6. The joint 28 permits the two parts of the arm 20 to be collapsed which reduces its installation size in the receptacle 6. In the case of application, the arm 20 pivots via the joint 26 out of the receptacle 6, wherein the two parts of the arm 20 open out via the joint 28, so that the arm 20 expands to its whole length. For this, suitable (non-shown) spring elements are arranged in the joints 26 and 28.

A guide means 30 is fastened at the free end of the arm 20. The guide means 30 is designed as a cord. A grip part 32, a so-called pull-flag is arranged at its free end. The guide means 30 is so long that the grip part 32 comes into the reach of the person 4. Apart from the guide means 30, also the one end of the pull cord 34 is fastened on the grip part 32, and the other end of this cord is connected to the oxygen mask 10.

If the person 4 pulls on the grip part 32, the connection of the guide means 30 is released from the arm 20. Since the release force required for this acts counter to the pivot force of the arm 24, this release force should be dimensioned suitably smaller than the pivot force.

The second oxygen mask 10 is applied by the person 4 via the still existing connection of the grip part 32 to the pull cord 34. By way of applying the oxygen mask 10, a pull force is also exerted onto the lanyard 16 and thus the supply of oxygen is activated so that the oxygen supply to the person 4 is ensured via the applied oxygen mask 10 in combination with its flexible supply tubing 18.

A hat rack (or overhead bin) 36 in the form of an interrupted line is also shown schematically in FIG. 1. The hat rack 36 is located in a lowered condition and blocks the actual end position of the arm 20 represented by the unbroken lines. On account of the articulated connection of the arm 20 on the receptacle 6, the arm 20 however is not damaged but pivots into a position represented in a dot-dashed manner in FIG. 1. In this position too the grip part is in reach of a person 4 so that the person 4 may also apply the oxygen mask 10.

Figure 2:
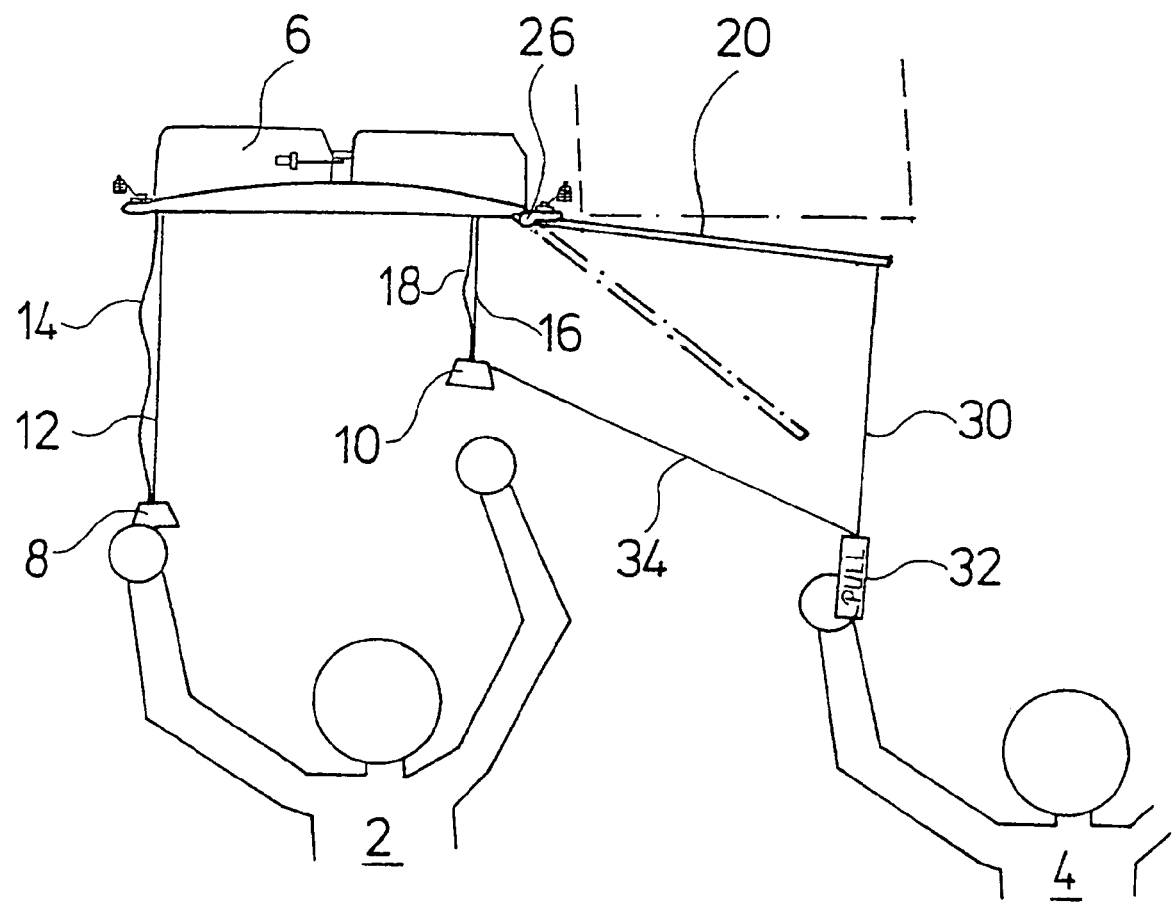
FIG. 2 is a schematic view showing the oxygen emergency supply means according to a second embodiment of the invention.

FIG. 2 shows an alternative embodiment in which the arm 20 is of a one part (one piece) design. In normal flight situations the arm is arranged in the mask container and in an emergency situation after opening, the container flap automatically extends downwards and to the side out of the container. Such a one-piece arm may for example be formed of bending-elastic plastic or of a memory metal so that it automatically expands. The arm functions in a manner similar to the arm 20 of the embodiment of FIG. 1. That is, in the case of application, the arm 20 pivots out of the lid opening, and assumes its predetermined position shown in solid line and may be pivoted into a position represented in a dot-dashed manner in FIG. 2.

Figure 3:
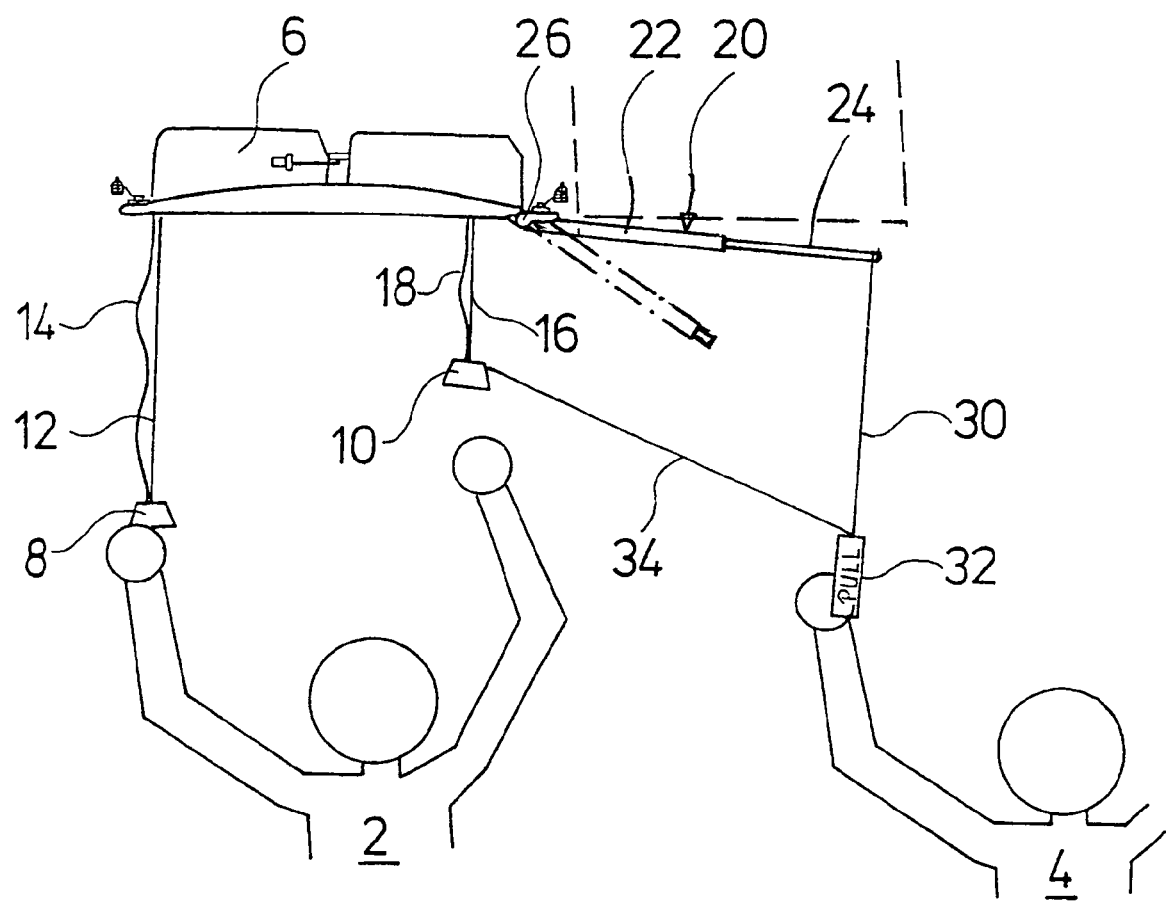
FIG. 3 is a schematic view showing the oxygen emergency supply means according to a third embodiment of the invention.

FIG. 3 shows another alternative embodiment in which the arm 20 is telescopic. The arm 20 is a telescopic cylinder. In its condition in which it is not telescopically extended represented in a dot-dashed manner, the arm may be stored in the mask container in a space saving manner. In the case of application the arm 20 extends from the container opening, in order to expand (shown in solid line) outside the mask container, for example by way of gravity, spring force or pneumatically.

While specific embodiments of the invention has been shown and described in detail to illustrate the application of the principles of the invention, it will be understood that the invention may be embodied otherwise without departing from such principles.

LIST OF REFERENCE NUMERALS

2 person
4 person
6 receptacle
8 oxygen mask
10 oxygen mask
12 lanyard
14 flexible supply tubing
16 lanyard, release cord
18 flexible supply tubing
20 joint arm
22 first arm part
24 second arm part
26 joint
28 joint
30 guide means
32 grip part
34 pull cord
36 hat rack

What is claimed is:

1. An aircraft oxygen emergency supply unit, comprising:
   a receptacle;
   an oxygen mask arranged in said receptacle, said receptacle comprising a structure with a lid opening and a lid which opens in the case of activation and releases said oxygen mask;
   a handling means for reaching and applying the oxygen mask, wherein the handling means comprise at least one arm, including a proximal end that is pivotally connected and a free end, which in the case of activation extends from a position within the receptacle out of the receptacle through the lid opening into a position laterally of a mask drop axis;
   a means for activating the oxygen supply to the mask.

2. An aircraft oxygen emergency supply unit according to claim 1, wherein said handling means includes a guide means arranged at the free end of said arm and extends parallel to the drop direction of the oxygen mask.

3. An aircraft oxygen emergency supply unit according to claim 2, wherein said guide means comprises a grip part at an end of said guide means, said end being spaced a distance from said arm.

4. An aircraft oxygen emergency supply unit according to claim 2, wherein said guide means comprises a pull cord for connection to the oxygen mask.

5. An aircraft oxygen emergency supply unit according to claim 1, wherein said arm comprises a pivot lever.

6. An aircraft oxygen emergency supply unit according to claim 5, wherein said arm is spring biased in the extension/pivot-out direction.

7. An aircraft oxygen emergency supply unit according to claim 1, wherein the arm comprises one piece.

8. An aircraft oxygen emergency supply unit according to claim 1, wherein the arm comprises more than one part.

9. An aircraft oxygen emergency supply unit according to claim 1, wherein a part of the arm is telescopic.

10. An aircraft oxygen emergency supply unit according to claim 1, wherein said arm is a part of said lid.

11. An aircraft oxygen emergency supply device, comprising:
    a receptacle with an opening;
    an oxygen mask arranged in the receptacle and movable to a released location outside the receptacle;
    an arm;
    a guide line arranged at the free end of said arm and extending in a drop direction of the oxygen mask, said guide including a grip part connected to said guide line and a pull cord, said pull cord being connected to said oxygen mask and said grip part, said arm with said guide line extending from a position within the receptacle out of said receptacle through said opening into a position laterally of the mask drop axis when said oxygen mask is in said released location such that said guide line extends in a drop direction of the oxygen mask at said position laterally of the mask drop axis, wherein said oxygen mask may be reached by a person seated laterally of the mask drop axis via said grip part and said pull cord.

12. An aircraft oxygen emergency supply unit according to claim 11, further comprising:
    a release line connected to the mask for activating the oxygen supply to the mask.

13. An aircraft oxygen emergency supply unit according to claim 11, wherein said arm comprises a pivot lever.

14. An aircraft oxygen emergency supply unit according to claim 13, wherein said arm is spring biased in the extension/pivot-out direction.

15. An aircraft oxygen emergency supply unit according to claim 11, wherein the arm comprises one piece.

16. An aircraft oxygen emergency supply unit according to claim 11, wherein the arm comprises more than one part.

17. An aircraft oxygen emergency supply unit according to claim 11, wherein a part of the arm is telescopic.

18. An aircraft oxygen emergency supply unit according to claim 1, wherein said arm is a part of a lid covering the opening prior to activation.

19. An aircraft oxygen emergency supply device, comprising:
 a receptacle with an opening;
 an oxygen mask arranged in the receptacle and movable to a released location outside the receptacle;
 an arm, including a proximal end that is pivotally connected and a free end, which pivots out of the receptacle through the opening and extends from a position within the receptacle to a position laterally of the mask drop axis when said oxygen mask is in said released location such that the mask may be reached by a person seated laterally of the mask drop axis.

20. An aircraft oxygen emergency supply unit according to claim 11, further comprising:
 a release line connected to the mask for activating the oxygen supply to the mask;
 a guide line arranged at the free end of said arm, said guide line extending in a drop direction of the oxygen mask when said arm is in said position laterally of the mask drop axis and when said oxygen mask is in said released location, said guide line including a grip part at an end thereof and a pull cord, said end being spaced a distance from said arm when said arm is in said position laterally of the mask drop axis, said pull cord being connected to said oxygen mask and said grip part such that the person seated laterally of the mask drop axis receives said oxygen mask via pulling said grip part.

* * * * *